United States Patent [19]

Caillouet

[11] Patent Number: 5,450,818
[45] Date of Patent: Sep. 19, 1995

[54] FLOATING FISH CULTIVATING SYSTEM AND RELATED METHOD

[75] Inventor: Earnest W. Caillouet, Brewton, Ala.

[73] Assignee: Float Culture Systems, Inc., Brewton, Ala.

[21] Appl. No.: 129,771

[22] Filed: Sep. 29, 1993

[51] Int. Cl.6 .............................................. A01K 61/00
[52] U.S. Cl. ...................................... 119/223; 119/226
[58] Field of Search ............... 119/223, 217, 226, 227, 119/228, 251, 252, 259, 260, 261, 264, 201, 203, 225; 210/169, 265, 321.89, 320

[56] References Cited

U.S. PATENT DOCUMENTS

| | | | |
|---|---|---|---|
| 3,399,135 | 8/1968 | Conley, Jr. et al. | 210/265 |
| 3,653,358 | 4/1972 | Fremont . | |
| 3,698,359 | 10/1972 | Fremont . | |
| 4,044,720 | 8/1977 | Fast . | |
| 4,377,017 | 3/1983 | Herpers et al. | 210/320 |
| 4,798,168 | 1/1989 | Vadseth et al. | 119/223 |
| 4,807,615 | 2/1989 | Wakagawa et al. | 119/201 |
| 5,189,981 | 3/1993 | Ewald, Jr. | 119/225 |

FOREIGN PATENT DOCUMENTS

| | | | |
|---|---|---|---|
| 2440338 | 5/1980 | France | 119/226 |
| 2614176 | 10/1988 | France | 119/259 |
| 228438 | 10/1985 | German Dem. Rep. | 119/223 |
| 3007783 | 9/1981 | Germany | 119/203 |
| 60157 | 11/1938 | Norway | 119/203 |
| 359339 | 10/1931 | United Kingdom | 119/226 |
| 431041 | 6/1935 | United Kingdom | 119/226 |
| 2026823 | 2/1980 | United Kingdom | 119/223 |
| 1409176 | 7/1988 | U.S.S.R. | 119/226 |
| 8101526 | 6/1981 | WIPO | 119/226 |
| 8808665 | 11/1988 | WIPO | 119/223 |

Primary Examiner—Gene Mancene
Assistant Examiner—Todd E. Manahan
Attorney, Agent, or Firm—Needle & Rosenberg

[57] ABSTRACT

Provided is a system for cultivating fish generally encompassing a container for water and fish, a pumping system for adding water to the container, and a separating device which directs the water and waste from the container, separates waste from the water, removes the separated waste, and conducts the water out of the separating device.

25 Claims, 4 Drawing Sheets

5,450,818

FLOATING FISH CULTIVATING SYSTEM AND RELATED METHOD

BACKGROUND OF THE INVENTION

1. Field of the Invention

This invention relates to a system and method for cultivating fish. More particularly, this invention relates to a system for cultivating fish that provides more control over the parameters of the fish cultivation process, increases the quantity of fish that may be raised per acre of water, and uses existing water sources, including some bodies of water wherein raising fish previously was not feasible.

2. Background Art

Fish is a major food source in the United States and the world. Raising the largest quantity fish at the least expense is necessary for an efficient operation. The efficiency of fish production may depend on the body of water being used. Not all bodies of water have been capable of effective production of fish. In many reservoirs, the amount of fish per acre has been limited by biological considerations; i.e., the waste produced by the fish increases the biological oxygen demand ("BOD") on the water, thus limiting the quantity of oxygen available to the fish.

Some floating fish pens are currently available to cultivate fish. For example, these floating pens are shown by Fast in U.S. Pat. No. 4,044,720 and by Fremont in U.S. Pat. No. 3,653,358 and U.S. Pat. No. 3,698,359. These fish cultivating devices do not remove fish waste or uneaten food from the water where the pen is floating. Instead, these waste products remain in the reservoir and increase the BOD. Thus, the fish cultivating systems available in the prior art do not allow an increase in the maximum quantity of fish that may be raised per acre of water because the systems provide no means to remove the oxygen-consuming waste and food products.

Additionally, although disease treatment is possible in existing systems, it is costly and time consuming. Once a problem is discovered in a cage cultivation system, the full body of water must be treated, not just the smaller cage holding the fish. The larger volume of water that must be treated correspondingly increases the treatment price and decreases efficiency. Alternatively, the cage must be encapsulated in plastic before treatment. With the floating pens, closely controlling the feeding and minimizing the waste is difficult, if not impossible. And, once the fish are ready to sell, the cost of retrieving the fish from several hundred feet netting and into the truck is expensive.

Furthermore, without aeration and water movement, the water of the reservoir may stratify. Stratification of water decreases the total amount of dissolved oxygen that the reservoir contains. As the amount of dissolved oxygen is reduced, the quantity of fish that a reservoir may support proportionally decreases. Existing fish cultivation systems do nothing to prevent or control stratification in the reservoirs in which they are used.

SUMMARY OF THE INVENTION

The above disadvantages of the prior art are overcome by the present invention which provides a container for fish, means for adding water to the container for fish from a reservoir, means for separating waste from the water in the container, means for removing the separated waste from the container water and the reservoir, and means of returning the water with the waste substantially removed to the reservoir.

The present invention provides means to cultivate large numbers of fish in bodies of water that would not sustain such a large number of fish with the prior art systems. Examples of these reservoirs may include rivers, lakes, gravel pits, and the like. The only requirements to operate the fish cultivating system of the present invention are acceptable starting water quality, sufficient depth, and access to a power source. The fish cultivating system may be moved within the body of water or relocated to a different reservoir if desired.

The fish cultivating system of the present invention can increase the fish production per acre by approximately four times or more over the existing systems. The present invention removes waste and uneaten food which reduce the biological oxygen demand ("BOD") in the reservoir. By removing these products which require oxygen during their breakdown, more dissolved oxygen exists for supporting a larger quantity of fish. Additionally, a healthier environment results from removing the waste and reducing the associated ammonia nitrogen.

The present invention also minimizes the cost of feeding, typically the largest expense in raising fish. The fish farmer has more control over the feed that the fish eat, because the present system affords a choice of feeding methods including, but not limited to, hand feeding, automatic feeders, and demand feeders. With the ability to choose more efficient feeding methods, more pounds of fish can be raised per pound of fish food used, because less of the food is wasted. Another advantage to raising and feeding the fish in the present system is that the larger fish may be separated from the smaller fish to insure a more even growth and reduce cannibalism.

The present invention additionally allows for more effective monitoring and treatment of disease. First, in the system the fish are generally maintained near the shore or the bank instead of being spaced throughout the reservoir as in pond culture, thus, monitoring for diseases is much easier and efficient. Next, if a disease is found in some fish, then only the container with the diseased fish must be treated. This localized treatment is more efficient and less costly than treating the entire reservoir. Moreover, the diseased fish are segregated to avoid the possible contamination of other fish in the reservoir or in other raceways.

In the present fish cultivating system, fish ready for harvest may be transferred to a truck using one of two easy methods. First, a dip net can be used to capture and carry the fish to the truck. Alternatively, a fish pump may be set into the raceway to pump the fish directly out of the container into the truck, because the containers are generally maintained near the shore.

The present invention also improves the aeration and movement of water in the reservoir, aiding in destratification. The result is that the water in the reservoir may hold more dissolved oxygen, which further increases the fish raising capacity of the reservoir. The mixing of the water also hinders the growth of blue-green algae, the presence of which can detrimentally affect the flavor, and the marketability of fish.

DETAILED DESCRIPTION OF THE INVENTION

The present invention may be understood more readily by reference to the following detailed description of the specific embodiment with reference to the Figures in which like numbers refer to like parts throughout the views.

Referring generally to FIGS. 1-6, one embodiment of a system for cultivating fish 10 is shown. The system for cultivating fish 10 generally encompasses a container 20 for water and fish, means in fluid communication with the container 20 for adding water to the container, means in fluid communication with the container 20 for separating waste from the water, means in fluid communication with the container 20 for directing the water and waste from the container 20 to the separating means, means for removing the separated waste from the separating means, and means in fluid communication with the separating means for conducting water out of the separating means.

Figure 1:
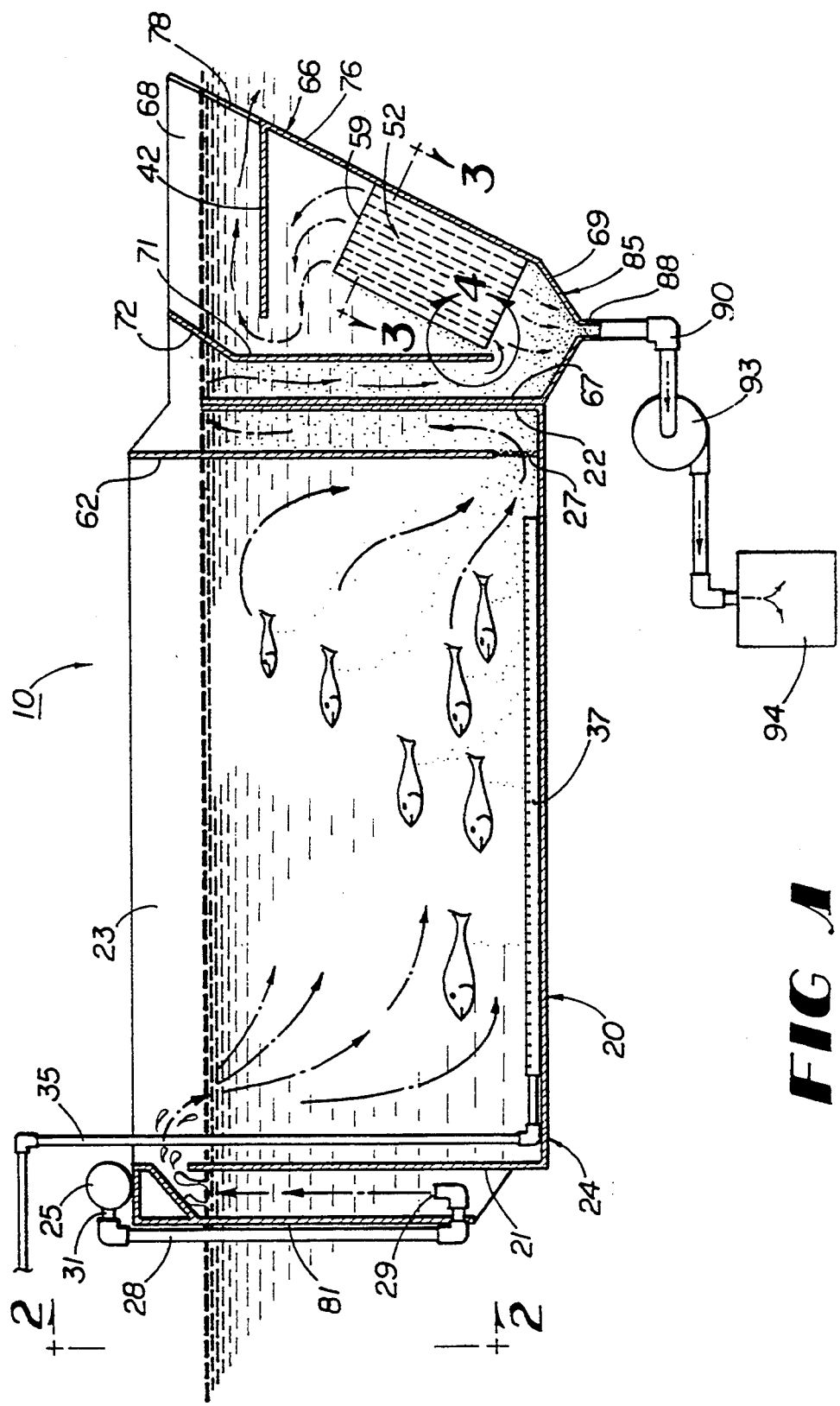
FIG 1 is an elevational longitudinal section view of the fish cultivation system.

As shown in FIG. 1, the container 20 comprises a first container wall 21 having a height above the water level in the container 20, a second container wall 22 spaced apart from the first container wall 21, two spaced apart container side walls 23 interconnecting the first wall 21 and the second wall 22, and a container bottom 24 interconnecting the two container side walls 23, the first container wall 21, and the second container wall 22. The container side walls 23 have a height above the water level in the container 20. The second container wall 22 has a height sufficiently below the water level in the container 20 to permit water to overflow the wall. The container 20 may further comprise at least one screen 27 spaced apart from the first container wall 21 and the second container wall 22 and adjacent to the container side walls 23, wherein the screen allows the water and water-borne waste in the container 20 to pass through freely but blocks the movement of either all the fish or the larger fish. Thus, the system for cultivating fish 10 may be segregated so as to allow the raising of more than one species of fish or the separation of different sizes of fish of the same species. The species of fish that may be raised by this fish cultivating system 10 include, but are not limited to, catfish, trout, salmon, carp, yellow perch, and talapia.

In the preferred embodiment of the present invention, water is added to the container 20 using a venturi system. A venturi system operates by releasing pressurized gas, such as air, below the water surface, whereby the gas rises to the surface and entrains water. Specifically, the water adding means may comprise a pumping system 45 for pressurizing the gas, a means for directing the pressurized gas so as to force water into the container 20, and a control system 40 for regulating the flow of pressurized gas to the gas directing means. The water may be added from a reservoir, a reservoir being defined as any water source either natural or artificial. In the presently preferred embodiment, the pumping system 45 comprises at least one pump 41, wherein the pump 41 is an electric centrifugal pump which pressurizes a high volume of gas output.

Figure 2:
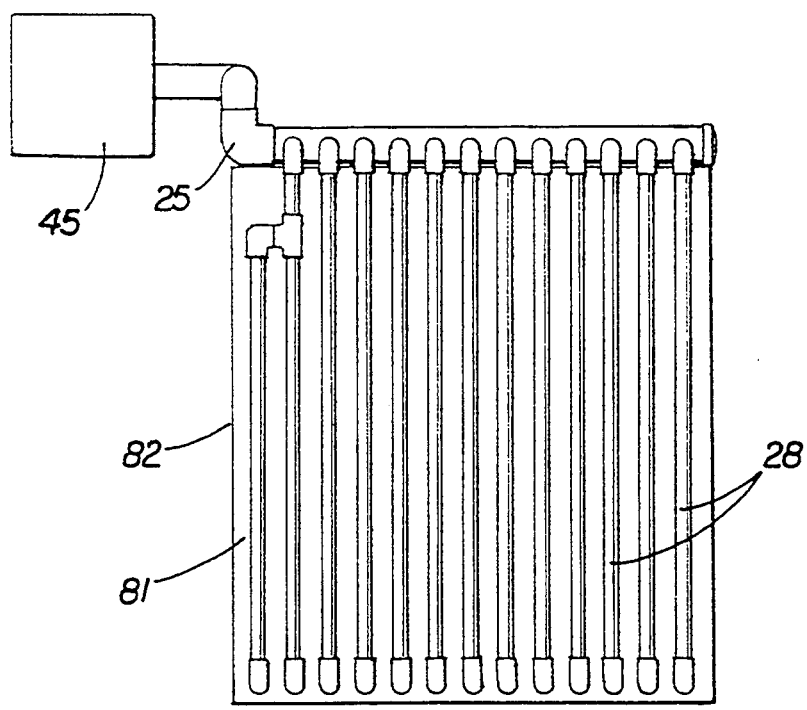
FIG. 2 is an end elevational view of the manifold taken at lines 2—2 in FIG. 1.
Figure 5:
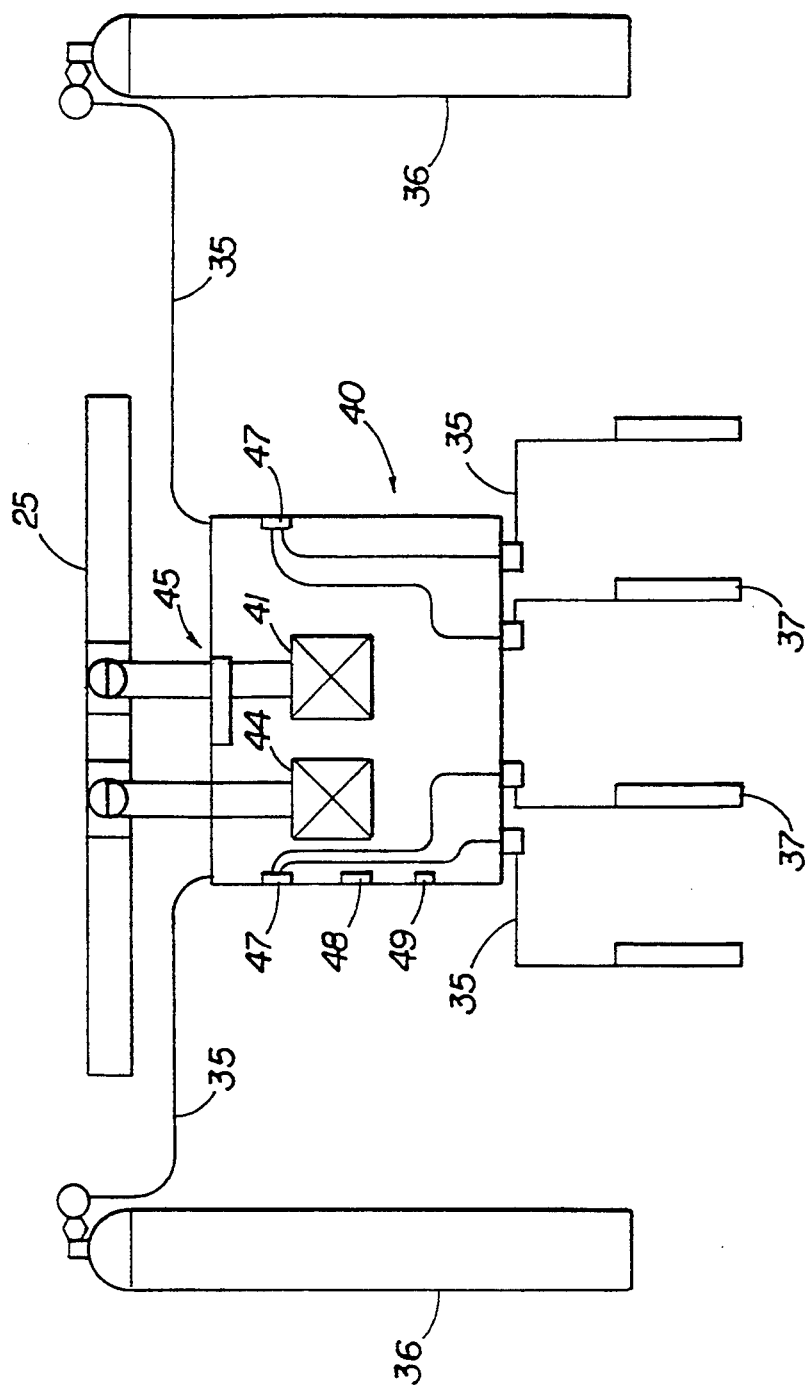
FIG. 5 is a schematic representation of the air pumps, its control system, and oxygen backup system.

As shown in FIGS. 1, 2 and 5, the gas directing means may comprise a header pipe 25 in fluid communication with the pumping system 45, which contains and directs the pressurized gas, and a plurality of tubes 28 of substantially equal length in fluid communication with the header pipe 25. The header pipe 25 may have a gas entrance which receives gas from a pump and a plurality gas exits that supply gas to the tubes 28. The tubes 28 contain and direct the pressurized gas from the header pipe 25. Each tube 28 may have an exit orifice 29 and an entrance orifice 31 which is in fluid communication with the header pipe 25.

In the present embodiment using a venturi system, as shown in FIG. 1 and FIG. 2, the water adding means may further comprise an upstanding venturi chute 80 in fluid communication with both the tubes 28 of the gas directing means and the reservoir. The venturi chute 80 may be comprised of a forward venturi wall 81 adjacent to the tubes 28, at least two venturi side walls 82 attached to the forward venturi wall 81, and a rear venturi wall attached to each venturi side wall 82 such that it is spaced apart from the forward venturi wall 81. The forward 81, rear, and two side walls 82 define an opening of the venturi chute 80 in fluid communication with the reservoir. Pressurized gas is directed into the venturi chute 80 by the tubes 28 at a point below the surface water level of the reservoir. The released air entrains and forces water from the reservoir up the venturi chute 80 and into the container 20. The rear venturi wall of the venturi chute 80 may be formed by the first container wall 21. The forward 81, rear, and two side walls 82 of the venturi chute 80 may extend below the exit orifices 29 of the tubes 28 of the gas directing means to permit water to be entrained from lower levels within the reservoir. Also, the bottom of the venturi chute 80 may be covered with a screen (not shown) to mechanically filter out unwanted fish and prevent fish from escaping the container. In the presently preferred embodiment, the exit orifice 29 of the tubes 28 directs pressurized gas into the venturi shoot 80 at a depth of about 34 inches below the surface of the reservoir. The depth of the exit orifices 29 satisfies two associated engineering concerns: it is deep enough to entrain a sufficient quantity of water in the venturi chute 80, yet it is not too deep so that the hydraulic pressure in the reservoir is greater than the output pressure of the pump. It will be understood by those skilled in the art that the depth chosen can be varied to satisfy these and other concerns, for example, fostering destratification.

Figure 6:
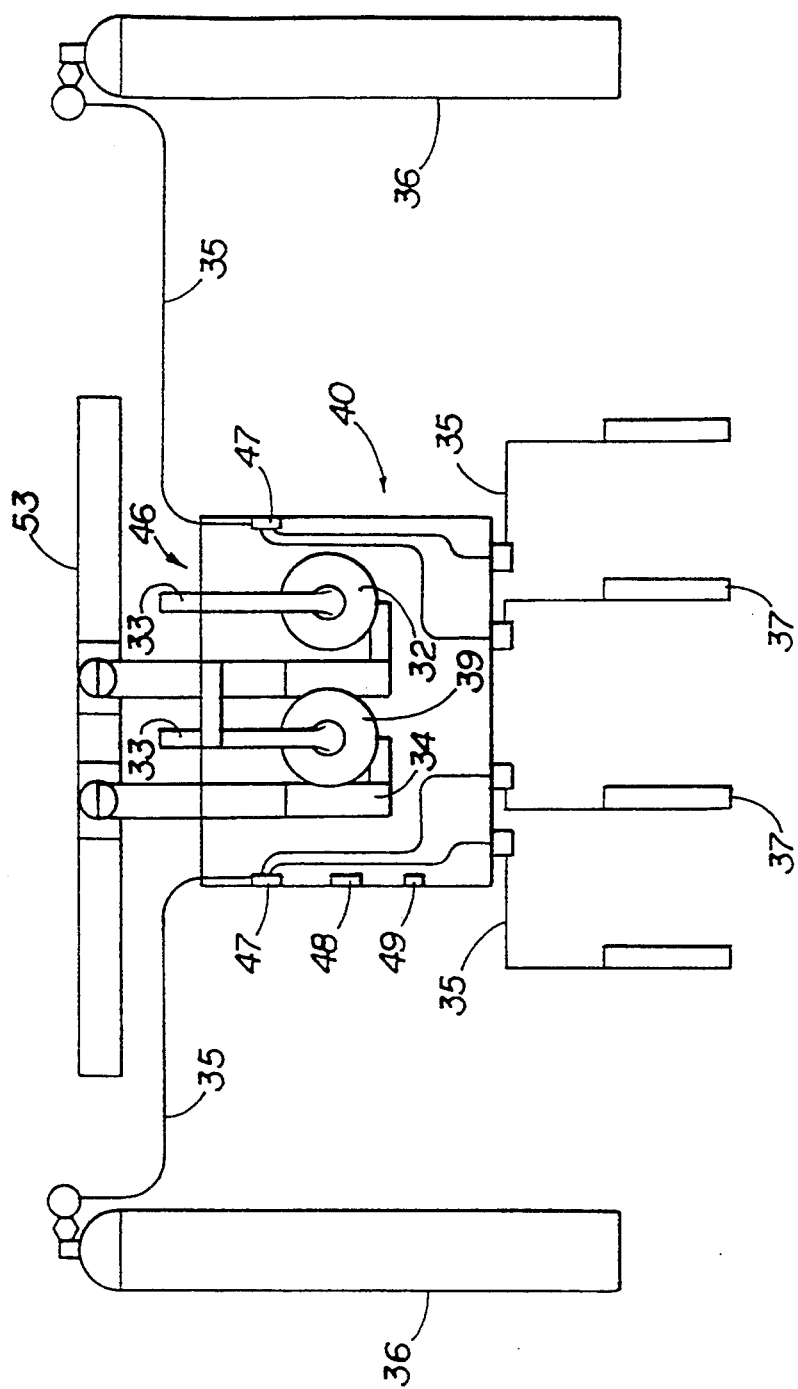
FIG. 6 is a schematic representation of the electric centrifugal pumps, its control system, and oxygen backup system.

As shown in FIG. 5, the control system 40 of the water adding means includes means for sensing a loss of pressure within the gas directing means or pump failure and provides a continuous flow of pressurized gas to the gas directing means by energizing an additional pump 44 when the control system senses a pressure decrease. For example, a pressure switch 48 is tripped at below 1 lb./inch$^2$ which sounds an alarm 49 or other notification means. Additionally, as shown in FIGS. 1, 5 and 6, the presently preferred embodiment of the fish cultivating system can have, as part of the control system 40, an oxygen delivery means comprising at least one high pressure oxygen canister, a connection tube 35 in fluid communication with the oxygen canister 36 which has an entrance end 38 attached to the high pressure oxygen canister and an opposite exit end, and an aerator tube 37 in fluid communication with the connection tube 35 and positioned in the water of the container 20. The aerator tube 37 has an open end attached to the exit end of the connection tube 35 and a closed end opposite to the open end. The aerator tube 37 may have a construction of porus material which allows the pressurized oxygen to exit the aerator tube 37. The closed end of the aerator tube 37 blocks the flow of the high pressure oxygen, forcing the oxygen to exit through the porous material only. The control system 40 in the presently preferred embodiment operates automatically upon a power failure of the pumping system using a normally open solenoid valve 47. The solenoid valve 47 is held closed by the electrical power supplying the pumping system 45. When the electrical power is lost, the solenoid valve 47 opens and provides a continuous flow of pressurized oxygen to the aerator tube 37 by ventilating at least one high pressure gas canister 36. This oxygen, provided through the aerator tube 37 into the container 20, maintains an acceptable dissolved oxygen concentration in the water of the container 20 until electric power is restored to the pumping system.

In an alternate embodiment shown in FIG. 6, the water adding means may comprise a pumping system 46 for adding water into the container 20 and a control system for regulating the flow of water into the container 20. The pumping system 46 may comprise an electric centrifugal pump 32 for pressurizing water having a suction end 33 in fluid communication with a source of water and a discharge end 34 in fluid communication with the container 20. This fluid communication may be provided by a pipe 53 having a fluid entrance in fluid communication with the discharge end 34 of the pump 32 and at least one fluid exit in fluid communication with the container 20. The control system 40 of this embodiment may operate as above, but by sensing a water pressure decrease within the pumping system or pump failure rather than a gas pressure decrease and, thus, provides a continuous flow of pressurized water to the container by energizing a second pump 39 when the control system 40 senses a pressure decrease. Additionally, an oxygen delivery means may be included as described above to protect against the loss of electric power.

As the water adding means continues to add water to the container 20, water and waste must correspondingly be removed. As shown in FIG. 1, the water and waste directing means may comprise a container partition 62 and a waste separator unit 66. The container partition 62, located within the container 20, is spaced apart from the second container wall 22. The container partition 62 has side edges, a bottom edge, and a top edge. The side edges are attached to the container side walls 23, the bottom edge is spaced apart from the container bottom 24 to permit the movement of water therebetween, and the top edge has a height above the water level in the container 20 to prevent water overflow.

The waste separator unit 66 may comprise a tube chamber 52, an input end wall 67, a bottom 69 comprising a waste removal means, two separator side walls 68, a separator weir 71, a first separator flow director 72, and a back end wall 76. The input end wall 67 extends to sufficiently below the water level of the container 20 to permit water to overflow from the container 20 into the waste separator unit 66. The two separator side walls 68 are spaced apart from each other and attached to the input end wall 67 and attached to the bottom comprising the waste removal means further described below. The two separator side walls 68 have a height above the water level of the waste separator unit 66. The separator weir 71 is attached to the separator side walls 68 and spaced apart from the input end wall 67 and spaced apart from the tube chamber 52 to permit the movement of water therebetween. The separator weir 71 has a height below the water level of the waste separator unit 66. The first separator flow director 72 has a bottom edge attached to the separator weir 71, two side edges each attached to the separator side walls 68, and a top edge having a height above the water level of the waste separating unit 66. The first separator flow director 72 is angled away from the input end wall 67 such that the bottom edge is closer to the input end wall 67 relative to the top edge. The first separator flow director 72 acts a flow director and a splash guard. The back end wall 76 is attached to the separator sides 68 and attached to the tube chamber 52 and diagonally disposed relative to the input end wall 67. The back end wall 76 has a top with a height sufficiently below the water level of the waste separating unit 66 to permit water to overflow. The waste separator unit 66 can further comprise a second separator flow director 42 above and spaced apart from the tube chamber 52, attached to the separator side walls 68 and to the top of the back end wall 76, spaced apart from the separator weir 71 to permit the movement of water therebetween, and disposed below the water level of the waste separating unit 66 to permit the flow of water into the reservoir.

Figure 3:
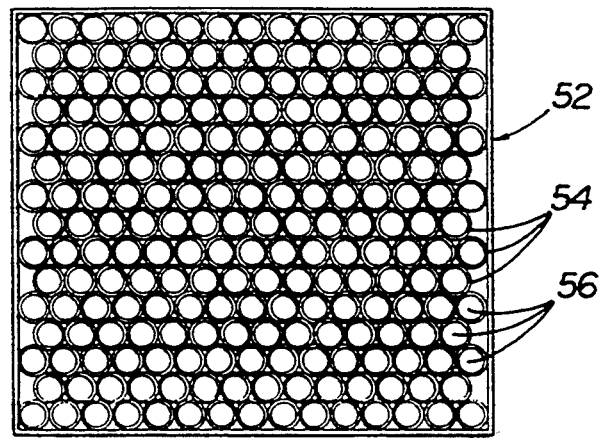
FIG. 3 is a plan sectional view of the waste separator taken at lines 3—3 in FIG. 1.
Figure 4:
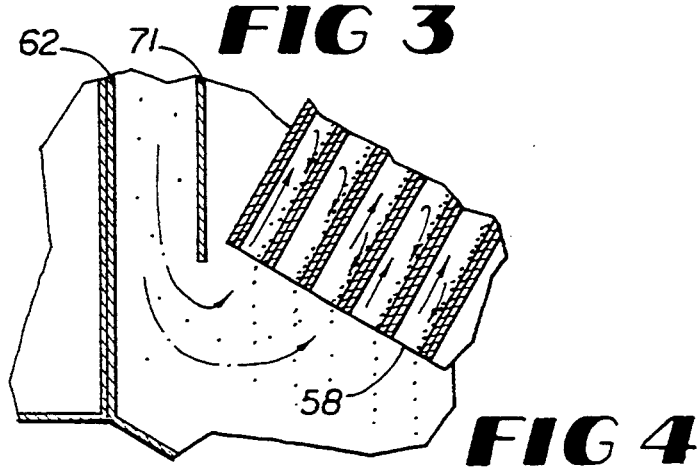
FIG. 4 is an enlarged elevational section view of a fragment of the waste separator taken at inset circle 4 in FIG. 1.

As shown in FIGS. 3 and 4, the waste separating means comprises a tube chamber 52 which has a plurality of adjacent tubular passageways 54, where each passageway 54 has a bore 56 generally parallel to the bore 56 of each other passageway 54. The bores 56 of the adjacent passageways 54 make an angle greater than zero relative to a horizonal reference plane as shown in FIGS. 1 and 4. Each passageway 54 has an inlet end 58, an outlet end 59, and a selected length and diameter. The inlet ends are disposed below the outlet ends. The water and the water-borne waste enter the passageway 54 through the inlet end 58. For fluid flow in a pipe, the fluid velocity is maximum at the center and zero at the pipe walls. As the water-borne waste travels through the passageway 54, it moves from the center of the bore 56 to the edge of the bore 56 because of the angle of the bore and the force of gravity and fluid flow patterns. As the water-borne waste flows from the center of the bore 54, the velocity of the water-borne waste decreases causing its kinetic energy to likewise decrease. The force of gravity becomes greater than the kinetic energy of the water-borne waste. The water-borne waste, therefore, moves downward toward and out of the inlet end 58 while the water flows through the length of the passageway 54 and exits the outlet end 59.

The tube chamber 52 is the primary means of removing water-borne waste from the water. Referring now to FIG. 1, the tube chamber 52 of the waste separating means is adjacent to and rests against the back end wall 76 of the waste separator unit 66 and disposed below the water level of the waste separator unit 66 permitting water flow through the tubular passageways 54. The tube chamber 52 extends substantially from one separator side wall 68 to the other separator side wall 68. The tube chamber 52 also extends substantially from the separator weir 71 to the back end wall 76. This prevents waste-containing water from passing out of the waste separator without passing through the tube chamber. In the presently preferred embodiment, an approximately one inch gap exists between the tube chamber 52 and the separator weir 71. This gap allows water-borne waste that may pass through outlet end 59 of the passageway 54 to separate from the water in this area as a result of an eddy current created by the second separator flow director 42 and still reach the waste removal means. Alternatively, the tube chamber 52 may be in contact with the separator weir 71.

In the presently preferred embodiment for raising catfish, the tubular passageways 54 are diagonally disposed relative to the horizonal reference plane at an angle of approximately 60 degrees, the passageways 54 are approximately one inch in diameter, and the tubes range in length from approximately 22 inches to approximately 29 inches. A range of angles from approximately 45 degrees to approximately 60 degrees can also be selected. To determine the dimensions of the passageways 54 and the angle relative to horizonal for waste generated by other types of fish, one can first use a method such as an Eimhoff cone to determine the time that it takes a given fish feces to drop a set distance. From this data and also considering the water flow rate, one skilled in the art could then determine the length of the passageways 54 and the angle required to be made with the horizonal reference plane to separate the water-borne waste from the water.

Once the water-borne waste is separated, it must be removed from the Water. In the presently preferred embodiment as shown in FIG. 1, the waste removal means may comprise a waste accumulator 85 disposed below and in fluid communication with the waste separator unit 66, a removal tube 90, a pump 93 for pumping the waste from the accumulator 85 through the removal tube 92, and a containment box 94. The pump 93 can be an air lift pump similar to the pump operating the venturi system and may be operated using the same blowers. Alternatively, a mechanical pump can be used. The waste accumulator 85 may have an upper portion, which interconnects the back end wall 76, the separator side walls 68, and the input end wall 67 of the waste separator unit 66, and a conical portion which has downwardly depending walls and an outlet portion 88. The removal tube 90 may have a first end and a second end, where the first end is connected to the outlet portion 88 of the waste accumulator 85. The containment box 94 is connected to the second end of the removal tube 90 for receiving waste.

After removing the waste from the water in the container 20, the water is directed back into the reservoir. In the presently preferred embodiment, the water conducting means may comprise an opening 78 in the back end wall 76.

In the presently preferred embodiment, the waste separating unit 66 is adjacent to the container 20 and held in place by cables. Alternatively, the input end wall may be formed by the second container wall 22. One skilled in the art would also know that the water and waste directing means can alternatively comprise a pump and tubes in fluid communication with both the container 20 and to the waste separating means 50 to pump water and waterborne waste to a separating means not in overflow communication with the container 20.

Furthermore, it should be noted that more than one fish cultivating system 10 may be combined in a parallel pattern. In other words, multiple fish cultivating systems 10 may be side-by-side. The parallel fish cultivating systems 10 may each have independent components. Alternatively, in the presently preferred embodiment, each fish cultivating system may have independent components with the exception of sharing the water adding means. Thus, a single pumping system for pressurizing a gas with its associated control system may be used for multiple fish containers 20. The header pipe 25 may be continuous for all of the parallel containers 20 or each container may have an independent header pipe 25 in fluid communication with the other header pipes 25 by a connection pipe (not shown). One advantage of the connected, independent header pipes 25 is that ball valves may be inserted in the connection pipe which throttle the air flow to each header pipe 25. Altering the air flow to the water adding means results in a corresponding change in the quantity of water added to and water flow rate into and out of the container 20.

The present invention also provides a method of harvesting fish in a raceway. The method can use the system as shown in FIGS. 1-4. The first step requires adding water to a container for fish from a reservoir. This may be achieved using a venturi chute in conjunction with pressurized air or, alternatively, by electric water pumps.

Second, the method involves separating waste from the added water using a tube chamber which has a plurality of adjacent tubular passageways, where each passageway has a bore generally parallel to the bore of each other passageway. The bores of the adjacent passageways make an angle greater than zero relative to a horizonal reference plane. Each passageway has an inlet end, an outlet end, a length, and a diameter. The water and the water-borne waste enter the passageway through the inlet end. For fluid flow in a pipe, the fluid velocity is a maximum at the center and zero at the pipe walls. As the water-borne waste travels through the passageway, it moves from the center of the bore to the edge of the bore because of the force of gravity and fluid flow patterns. As the water-borne waste moves from the center of the bore, the velocity of the water-borne waste decreases causing its kinetic energy likewise decrease. The force of gravity becomes greater than the kinetic energy of the water-borne waste. The water-borne waste, therefore, moves toward and out of the inlet end while the water flows through the length of the passageway and exits the outlet end.

Next, the method requires removing the separated waste. The waste is separated from the water in large part using a tube chamber as described above. The waste also may be removed in the areas of low water velocity in a waste separator unit. The first low flow region encompasses the area between the inlet end of the passageways and the waste accumulator. The second low flow region encompasses the area between the second flow director, the outlet end of the passageways and the separator weir. The waste falls out of the water based upon the Mass Flow Rate Equation. The equation is as follows:

$$M = \rho A V$$

where M is the mass flow of the water, $\rho$ is the density of the waste, A is the area of the flow, and V is the velocity of the flow. Water is neither added nor removed in the fish cultivating system, so the mass flow rate (M) is a constant. The temperature of the water remains approximately constant and the water-borne waste only encompasses a small fraction of the water, so density (ρ) also remains approximately constant. Therefore, as the area (A) of the flow increases, then the velocity (V) of the flow correspondingly decreases to maintain the mass flow rate (M) as a constant. Thus, as the water flows into the low flow regions of the bores waste separating unit described above, then the kinetic energy of the water-borne waste decreases. If the kinetic energy of the waste decreases sufficiently, gravity forces the waste toward and into a waste accumulator.

Once the waste enters the waste accumulator 85 the tube chamber or from either of the low flow regions, a pump for pumping the waste from the waste accumulator forces the waste and some water to a containment box. The containment box settles out the waste so as to allow the waste to be disposed of in a location other than the reservoir.

Last, the method involves returning the water from which the waste is removed into the reservoir. The water is returned by flowing from the outlet end of the tube chamber, underneath a second flow director, over the top of the second flow director, and into the reservoir out an opening in the back end wall. Alternatively, the water will be returned to the reservoir out of the opening in back end wall even without second flow director. Additionally, the water that flows through the containment box is typically returned to the reservoir. The water inside the box is in communication with the reservoir through a screened area permitting constant exchange of water.

The flow pattern of the presently preferred embodiment further provides a method for promoting water mixing and hindering the occurrence of stratification in the reservoir. This may be achieved by removing water from a depth in the reservoir having a low level of dissolved oxygen and/or from a depth below the temperature thermocline and returning the water to the surface of the reservoir after it traverses the fish cultivating system. The resulting cycling of water from the lower depths of the reservoir to the surface of the reservoir allows more dissolved oxygen to remain in solution, thus further increasing the fish rasing capacity of the reservoir. Furthermore, the directing of the water from which the waste is removed in one direction causes mixing in the reservoir. This mixing destroys the habitat of blue-green algae, which requires stagnant water to grow. Hindering the growth of blue-green algae has an advantage because blue green-algae may result in an undesirable taste in the fish, thus making the fish less marketable.

Although the present process has been described with reference to specific details of certain embodiments thereof, it is not intended that such details should be regarded as limitations upon the scope of the invention except as and to the extent that they are included in the accompanying claims.

What is claimed is:
1. A system for cultivating fish in water, comprising:
   a. container for holding a selected level of water and fish;
   b. means in fluid communication with the container for adding water to the container;
   c. means in fluid communication with the container for separating waste from the water, comprising a tube chamber having a plurality of adjacent tubular passageways, each passageway having an inlet end, an outlet end, a length, and a diameter, each passageway having a bore generally parallel to the bore of each other passageway, the inlet ends being below the outlet ends so as to be diagonally disposed relative to a horizontal reference plane at an angle ranging from approximately 45 degrees to approximately 60 degrees, wherein the flow rate of water-born waste from the container which enters each passageway through the inlet end thereof is slowed such that the water-born waste moves back toward and out of the inlet end and the water, with the waste substantially moved therefrom, flows out of the outlet end;
   d. means in fluid communication with the waste separating means for removing the waste from the separating means; and
   e. means in fluid communication with the separating means for conducting water that flows from the outlet ends of the passageways out of the separating means.

2. The fish cultivating system of claim 1, wherein the container comprises:
   a. a first container wall having a height above the water level in the container;
   b. a second container wall spaced apart from the first container wall, having a height sufficiently below the water level in the container to permit water to overflow;
   c. two spaced apart container side walls interconnecting the first wall and the second wall and having a height above the water level in the container; and
   d. a container bottom interconnecting the two container side walls, the first container wall, and the second container wall.

3. The fish cultivating system of claim 2, wherein the water adding means comprises:
   a. a pumping system for pressurizing a gas;
   b. means for directing the pressurized gas so as to force water into the container; and
   c. a control system for regulating the flow of the pressurized gas to the directing means.

4. The fish cultivating system of claim 3, wherein the pumping system comprises at least one pump.

5. The fish cultivating system of claim 4, wherein at least one pump is an electric centrifugal pump pressurizing a high volume of gas output.

6. The fish cultivating system of claim 4, wherein the control system comprises an additional pump, means for sensing a decrease in pressure in the pumping system and means for energizing the additional pump when the control system senses a pressure decrease so as to provide a continuous flow of pressurized gas to the gas directing means.

7. The fish cultivating system of claim 3, further comprising an oxygen delivery means comprising:
   a. at least one high pressure oxygen canister;
   b. a connection tube in fluid communication with at least one oxygen canister having an entrance end attached to at least one high pressure oxygen canister and an opposite exit end;
   c. an aerator tube in fluid communication with the connection tube and positioned in the water of the container, the aerator tube having an open end attached to the exit end of the connection tube and a closed end opposite the open end and being porous along at least a portion of its length to allow the pressurized oxygen to exit the aerator tube to increase the dissolved oxygen concentration in the water of the container.

8. The fish cultivating system of claim 7, wherein the control system comprises means for sensing a power failure of the pumping system and means for ventilating the at least one high pressure oxygen canister to maintain the dissolved oxygen concentration in the water of the container.

9. The fish cultivating system of claim 3, wherein the gas directing means comprises:
   a. a header pipe in fluid communication with the pumping system to contain and direct the pressurized gas, having a gas entrance and a plurality gas exits; and
   b. a plurality of tubes of substantially equal length in fluid communication with the header pipe to contain and direct the pressurized gas from the header pipe, each tube having an exit orifice and an entrance orifice in fluid communication with a respective one header pipe exit.

10. The fish cultivating system of claim 9, wherein the gas directing means further comprises an upstanding venturi chute in fluid communication with the tubes of the gas directing means and with a reservoir, comprising:
   a. a forward venturi wall adjacent to the tubes;
   b. at least two venturi side walls attached to the forward venturi wall; and
   c. a rear venturi wall attached to each venturi side wall such that it is spaced apart from the forward venturi wall whereby the forward, rear, and two side walls define an opening of the venturi chute in fluid communication with the reservoir, whereby pressurized gas is directed into the venturi chute by the tubes at a point below the water level of the reservoir to force water from the reservoir up the venturi chute and into the container.

11. The fish cultivating system of claim 10, wherein the first container wall is formed by the rear venturi wall of the venturi chute.

12. The fish cultivating system of claim 10, wherein the forward, rear, and two side walls of the venturi chute extend below the exit orifices of the tubes of the gas directing means.

13. The fish cultivating system of claim 10, wherein the tubes directing pressurized gas into the venturi shoot are located at a depth of about 34 inches below the surface of the reservoir.

14. The fish cultivating system of claim 2, wherein the waste separating means further comprises:
   a. a container partition in the container spaced apart from the second container wall, having side edges, a bottom edge, and a top edge, the side edges being attached to the container side walls, the bottom edge spaced apart from the container bottom to permit the movement of water therebetween, and the top edge having a height above the water level in the container to prevent water overflow; and
   b. a waste separator unit, adjacent the second container wall and comprising:
      i) an input end wall extending sufficiently below the water level of the container to permit water to overflow from the container into the waste separator unit;
      ii) a bottom in communication with the waste removal means;
      iii) two separator side walls spaced apart from each other and attached to the input end wall and attached to the removal means and having a height above the water level of the waste separator unit;
      iv) a separator weir attached to the separator side walls and spaced apart from the input end wall to permit the movement of water therebetween and having a top edge below the water level of the waste separator unit and lower edge positioned relative to the tube chamber so as to direct the water thereto;
      v) a first separator flow director, having a bottom edge attached to the top edge of the separator weir, two side edges each attached to the separator side walls, and a top edge having a height above the water level of the waste separating unit, and angled away from the input end wall such that the bottom edge is closer to the input end wall relative to the top edge; and
      vi) a back end wall attached to the separator sides and inclined relative to the input end wall and having a top with a height sufficiently below the water level of the waste separating unit to permit water to overflow.

15. The fish cultivating system of claim 14, wherein the input end wall is formed by the second container wall.

16. The fish cultivating system of claim 14, wherein the tube chamber is attached to the back end wall of the waste separator unit and disposed below the water level of the waste separator unit permitting water flow through the tubular passageways, extending substantially from one separator side wall to the other separator side wall and substantially from the separator weir to the back end wall.

17. The fish cultivating system of claim 16, wherein the tubular passageways are approximately one inch in diameter and range in length from approximately 22 inches to approximately 29 inches.

18. The fish cultivating system of claim 16, wherein the waste removal means comprises:
   a. a waste accumulator disposed below and in fluid communication with the waste separator unit;
   b. a removal tube having a first end and a second end, wherein the first end is connected to an outlet portion of the waste accumulator;
   c. a pump for pumping the waste from the accumulator through the removal tube; and
   d. a containment box connected to the second end of the removal tube for receiving waste.

19. The fish cultivating system of claim 14, wherein the conducting means comprises a second separator flow director above and spaced apart from the outlet ends of the tubular passageways and attached to the separator side walls and to the back end wall and having a free edge, the free edge of the second separator flow director being spaced apart from the separator weir to permit the movement of water therebetween, the second separator flow director being disposed below the water level of the waste separating unit to permit the flow of water into the reservoir.

20. The fish cultivating system of claim 2, wherein the container further comprises at least one screen spaced apart from the first container wall and the second container wall and adjacent to the container side walls, wherein at least one screen allows the water and water-borne waste in the container to pass through freely but blocking the movement of the fish, thus segregating the container.

21. The fish cultivating system of claim 1, wherein the water adding means comprises:
   a. a pumping system for adding water into the container; and
   b. a control system for regulating the flow of water into the container.

22. The fish cultivating system of claim 21 wherein the pumping system comprises an electric centrifugal pump for pressurizing water having a suction end in fluid communication with a source of water and a discharge end in fluid communication with the container.

23. The fish cultivating system of claim 22, wherein the control system comprises an additional pump, means for sensing a water pressure decrease within the pumping system and means for energizing the additional pump when the control system senses a pressure decrease so as to provide a continuous flow of pressurized water to the container.

24. The fish cultivating system of claim 23 further comprising a pipe having a fluid entrance in fluid communication with the discharge end of the electrical centrifugal pump and at least one fluid exit in fluid communication with the container.

25. A method of cultivating fish in a raceway, which comprises:
   a. adding water to a container for fish from a reservoir;
   b. separating waste from the added water by passing waste-containing water through a plurality of adjacent tubular passageways, each passageway having an inlet end, an outlet end, a length, and a diameter, each passageway having a bore generally parallel to the bore of each other passageway, the inlet ends being below the outlet ends so as to be diagonally disposed relative to a horizonal reference plane at an angle ranging from approximately 45 degrees to approximately 60 degrees, wherein the flow rate of water-born waste from the container which enters each passageway through the inlet end thereof is slowed such that the water-born waste moves back toward and out of the inlet end and the water, with the waste substantially removed therefrom, flows out of the outlet end;
   c. removing the separated waste; and
   d. returning the water from which the waste is removed into the reservoir.

* * * * *